United States Patent
Fuglsang et al.

(10) Patent No.: US 8,917,383 B2
(45) Date of Patent: Dec. 23, 2014

(54) WIND TURBINE BLADE PROVIDED WITH OPTICAL WIND VELOCITY MEASUREMENT SYSTEM

(75) Inventors: Peter Fuglsang, Vejle (DK); Lars Fuglsang, Odense S (DK); Lars Christian Hvidegaard Hammer, Fredericia (DK)

(73) Assignee: LM Glasfiber A/S, Kolding (DK)

( * ) Notice: Subject to any disclaimer, the term of this patent is extended or adjusted under 35 U.S.C. 154(b) by 215 days.

(21) Appl. No.: 13/512,512

(22) PCT Filed: Nov. 26, 2010

(86) PCT No.: PCT/EP2010/068301
§ 371 (c)(1),
(2), (4) Date: May 29, 2012

(87) PCT Pub. No.: WO2011/064329
PCT Pub. Date: Jun. 3, 2011

(65) Prior Publication Data
US 2012/0229792 A1    Sep. 13, 2012

(30) Foreign Application Priority Data
Nov. 30, 2009  (EP) .................................. 09177500

(51) Int. Cl.
*F03D 7/02*  (2006.01)

(52) U.S. Cl.
CPC ............ *F03D 7/0232* (2013.01); *F03D 7/0224* (2013.01); *F05B 2270/326* (2013.01); *F05B 2270/804* (2013.01); *Y02E 10/723* (2013.01); *F05B 2260/82* (2013.01); *F05B 2270/32* (2013.01)
USPC .......................................... 356/28; 356/28.5

(58) Field of Classification Search
CPC ............... G01P 3/36; G01P 5/26; F03D 7/00; F03D 7/022; F05B 2270/32
USPC ............. 356/3.01–3.15, 4.01–4.1, 5.01–5.15, 356/6–22, 28, 28.5
See application file for complete search history.

(56) References Cited

U.S. PATENT DOCUMENTS

| | | | |
|---|---|---|---|
| 6,320,272 | B1 | 11/2001 | Lading et al. |
| 2006/0140764 | A1 | 6/2006 | Smith et al. |

(Continued)

FOREIGN PATENT DOCUMENTS

| | | |
|---|---|---|
| WO | 98/42980 A1 | 10/1998 |
| WO | 2004/074681 A1 | 9/2004 |
| WO | 2007/045940 A1 | 4/2007 |
| WO | 2010/106322 A2 | 9/2010 |

*Primary Examiner* — Luke Ratcliffe
(74) *Attorney, Agent, or Firm* — Nath, Goldberg & Meyer; Jerald L. Meyer; Sanjana Mangalagiri

(57) ABSTRACT

A wind turbine includes a number of blades and an optical measurement system comprising a light source, such as a laser, an optical transmitter part, an optical receiver part, and a signal processor. The light source is optically coupled to the optical transmitter part, which includes an emission point for emitting light in a probing direction. The optical receiver part comprises a receiving point and a detector. The optical receiver part is adapted for receiving a reflected part of light from a probing region along the probing direction and directing the reflected part of light to the detector to generate a signal used to determine a first velocity component of the inflow. The emission point is located in a first blade at a first radial distance from a center axis, and the receiving point is located in the first blade at a second radial distance from the center axis.

24 Claims, 8 Drawing Sheets

(56) References Cited

U.S. PATENT DOCUMENTS

| | | |
|---|---|---|
| 2007/0075546 A1 | 4/2007 | Avagliano et al. |
| 2009/0046289 A1 | 2/2009 | Caldwell et al. |
| 2010/0085557 A1* | 4/2010 | Antoniou et al. ............ 356/28.5 |
| 2011/0106324 A1* | 5/2011 | Tsadka et al. ................. 700/287 |

* cited by examiner

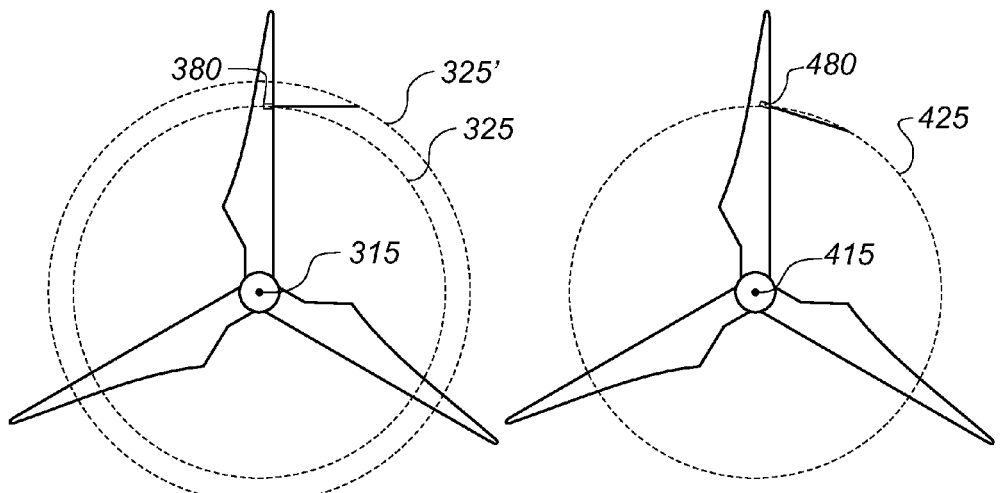
*Fig. 6a*  *Fig. 6b*
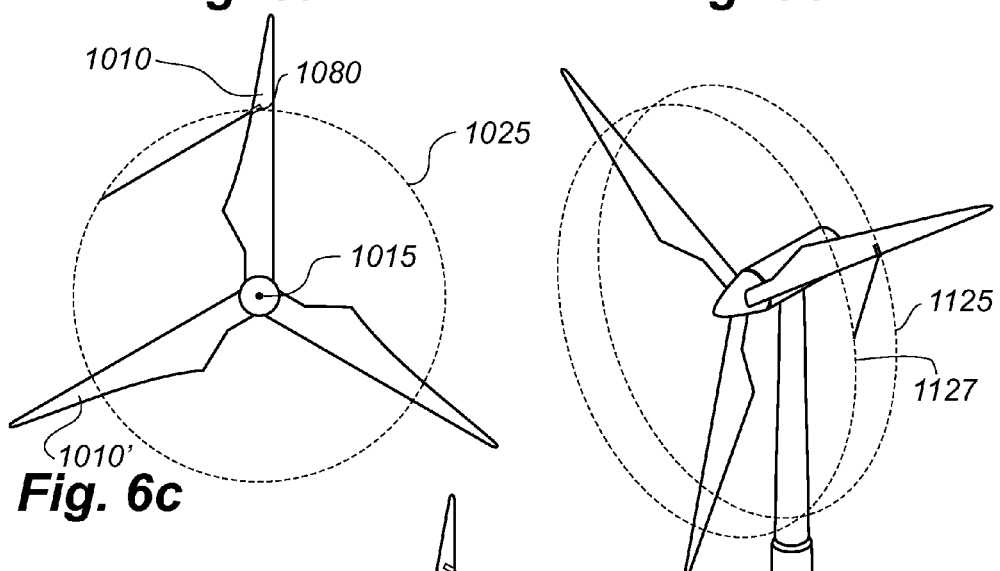
*Fig. 6c*  *Fig. 7*
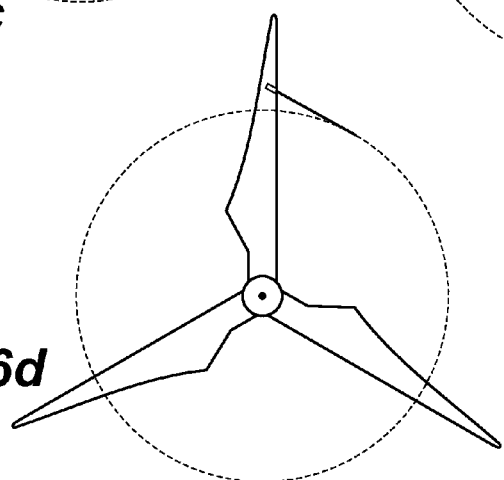
*Fig. 6d*

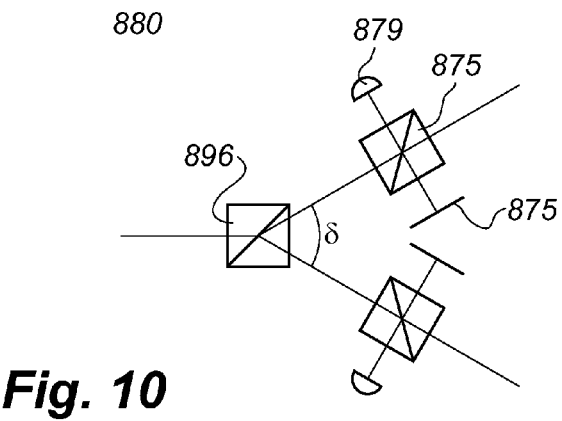
Fig. 10
Fig. 11a
Fig. 11b
Fig. 11c
Fig. 11d
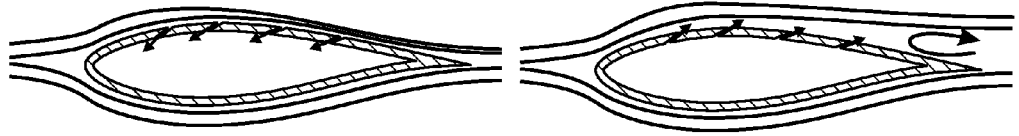
Fig. 11e  Fig. 11f
Fig. 11g

WIND TURBINE BLADE PROVIDED WITH OPTICAL WIND VELOCITY MEASUREMENT SYSTEM

This is a National Phase Application filed under 35 U.S.C. 371 as a national stage of PCT/EP2010/068301 filed Nov. 26, 2010, and claims priority benefit from European Application No. 09177500.7, filed Nov. 30, 2009, the content of each of which is hereby incorporated by reference in its entirety.

TECHNICAL FIELD

The present invention relates to a wind turbine comprising a number of blades including at least a first wind turbine blade extending substantially radially from a hub on a main shaft having a substantially horizontal centre axis, the blades together with the hub constituting a rotor with a rotor plane, and which can be put into rotation by wind, and each blade having an innermost part comprising a root section of the blade and an outermost part comprising a tip section of the blade, wherein the wind turbine comprises an optical measurement system comprising a light source, such as a laser, an optical transmitter part, an optical receiver part, and a signal processor. The light source is optically coupled to the optical transmitter part. The optical transmitter part comprises an emission point and is adapted for emitting light in a probing direction from said emission point. The optical receiver part comprises a receiving point and a detector, wherein the optical receiver part is adapted for receiving a reflected part of light from a probing region along the probing direction at the receiving point and directing said reflected part of light to the detector so as to generate a signal from the detector based on the received, reflected light. The signal processor is adapted to determine at least a first velocity component of the inflow from the signal generated by the optical receiver part. The invention further relates to a method of operating a wind turbine comprising a number of blades including at least a first wind turbine blade extending substantially radially from a hub on a main shaft having a substantially horizontal centre axis, the blades together with the hub constituting a rotor with a rotor plane, and which can be put into rotation by wind, and each blade having an innermost part comprising a root section of the blade and an outermost part comprising a tip section of the blade.

BACKGROUND

Modern wind turbines are used to produce electricity. They are often very large structures with blades of up to and in excess of 60 meters and made from fibre-reinforced polymer structures, such as shell elements. These wind turbines are provided with control devices which may prevent an overloading of the wind turbine and the blades at wind gusts and high wind speeds. Such control devices can also be used to slowing the rotor down and bringing it to a complete halt, if the wind speed becomes too high. In addition to these devices the turbine may comprise a braking system arranged in communication with the main shaft of the wind turbine.

The control devices may be formed of pitch-controlled blades mounted such on the hub that they are able to turn about their longitudinal axis. The blades may thus be continuously adjusted to provide the lift rendering the desired power. In so-called stall-controlled wind turbines the blades are fixedly mounted on the hub and thus unable to turn about their longitudinal axis. In this case, the stall properties of the blades are used to reduce the aerodynamic lift and thus the power output.

The lengths of wind turbine blades have increased over the years and may now as previously mentioned exceed 60 meters. The increase in length also leads to increased mechanical loads from strong winds and from fluctuations in the wind. The loads are primarily caused by changes in the local inflow or turbulence. This in turn causes pressure changes over the surface of the wind turbine blade, which finally changes the loads on the blade. Typically, the loads are measured by use of strain gauges, which are mounted on the blade or imbedded in the shell structure of such a blade. Such strain gauges may for instance be resistive or in form of optical fibres, e.g. provided with Bragg gratings. However, once the effect on the load is detected, it is already too late to fully compensate for the load changes. To do so, information on the changes in the inflow or turbulence is needed beforehand, i.e. before these inflow changes impact the wind turbine blade. This may for instance be obtained by arranging pitot tubes at the leading edge of the blade in order to probe the wind velocity. However, such pitot tubes influence the flow characteristics of the blade, and furthermore pitot tubes may act as a lightning receptor, thus attracting lightning strikes potentially damaging the wind turbine blade. Light Detection And Ranging (LIDAR) systems may be used for non-invasive probing of wind velocities upwind of the wind turbine and have been proposed used in connection with compensating for yaw errors or keeping the rotational speed of the rotor substantially constant by pitching the individual wind turbine blades. The LIDAR system is typically proposed to be mounted on top of the nacelle of the wind turbine and probes wind speeds in a probing region located hundreds of meters in front of the wind turbine.

U.S. Pat. No. 6,320,272 describes a wind turbine provided with a LIDAR system on top of the nacelle. The LIDAR system is utilised for anticipating the wind speed upwind of the wind turbine and pitching the blade in order to obtain a substantially constant rotational speed of the rotor.

US2006140764 discloses a LIDAR system mounted in the hub of a wind turbine. The LIDAR has a viewing direction, which is inclined to the rotational axis so that the rotation of the hub ensures a scanning in front of the rotor.

US 2007075546 discloses a wind turbine provided with a LIDAR system for measuring wind speeds in front of a portion of a wind turbine blade. The LIDAR is mounted in the hub or at a base of the tower.

However, the wind is non-uniform over the length of a wind turbine blade due to turbulence, tower shadow, wind shear, yaw errors, wake effects and the like. This non-uniformity causes varying forces along the blades, which is turn cause fatigue loads and extreme loads on the wind turbine. These phenomena become even more pronounced as the wind turbine blades become longer and longer. To compensate for such fluctuations it is not sufficient to obtain a single measurement hundreds of meters in front of the rotor.

WO2007045940 discloses a wind turbine blade having a variable aerodynamic profile. The document further mentions that a laser anemometer may be used to measure the wind speed in front of the blade and that an anemometer may be arranged near the tip of the blade. However, the document does not provide any details on how such an anemometer should be mounted to the blade and where exactly the anemometer should probe the wind speed.

WO2004075681 discloses a method of controlling aerodynamic load of a wind turbine based on a local blade flow measurement. The document mentions that a laser Doppler anemometer may be utilised to measure the instant angle of attack or the wind velocity. However, the document does not provide any details on where and how to arrange the anemometer.

DISCLOSURE OF THE INVENTION

It is an object of the invention to obtain a new blade, and which overcomes or ameliorates at least one of the disadvantages of the prior art or which provides a useful alternative.

According to a first aspect of the invention, the emission point of the optical transmitter part is located in the first blade at a first radial distance from the centre axis, and the receiving point of the optical transmitter part is located in the first blade at a second radial distance from the centre axis. In this way, the wind turbine facilitates an optical measurement system, such as a LIDAR (Light Detection And Ranging) system, for measuring at least a first parameter of an inflow, such as wind speed or wind direction, locally at the first wind turbine blade. The optical emitting means and receiving means together define a probing region or probing volume, in which a measurement may be made.

Throughout this document, inflow is to be understood as the apparent wind direction as seen from a point on the first blade, i.e. as the vector difference of the wind velocity vector and the local relative rotor velocity vector in the particular cross-section on the first blade.

A reflected part of the light emitted from the optical emitting means is to be understood as any part of the light which returns towards the receiving means by reflection on aerosols, by diffraction, by elastic or inelastic scattering, or by any other physical phenomenon. As such, it is not to be restricted to pure reflection in an optical meaning. In a preferred embodiment, the wind turbine comprises two or three blades. Preferably, the wind turbine is an upwind wind turbine with a substantially horizontal shaft. According to an advantageous embodiment, the probing direction is directed in an upwind direction of the first wind turbine blade.

In an advantageous embodiment, the emission point substantially flushes with a surface of the first wind turbine blade. Thus, the optical measurement system is truly obstruction free, since no protrusions or indentations are found on the blade surface, and only light is sent to the probing region, thus not influencing the flow around the blade.

According to an advantageous embodiment, the first radial position is substantially identical to the second radial position. Thus, the reflected light is collected substantially at the same radial position as it is emitted.

According to a preferred embodiment, the first blade further comprises adjustable flow altering means, such as distributed actuators, flaps or micro tabs, for adjusting an aerodynamic parameter of the blade and located in a third radial distance from the hub, the adjustable flow altering means being controlled by a controlling means, and wherein the controlling means are adapted to receive a signal from the signal processor, the signal being based on at least the first velocity component. Thus, the flow altering means are adjusted in response to a measured wind velocity component, the wind turbine thereby being able to adjust for fluctuations in the wind velocity. Advantageously, the third radial position is substantially identical to the first radial position. Thus, the flow altering means are adjusted locally in accordance with a local wind velocity measurement.

In another embodiment, the wind turbine comprises a second wind turbine blade, and wherein the second wind turbine blade is provided with adjustable flow altering means, such as distributed actuator, flaps or micro tabs, for adjusting an aerodynamic parameter of the second blade, the adjustable flow altering means being controlled by a controlling means, and wherein the controlling means are adapted to receive a signal from the signal processor, the signal being based on at least the first velocity component. Thus, the aerodynamic parameter of the second blade is adjusted in accordance with measurements carried out via the first blade. Thus, the second blade can be adjusted accordingly before encountering the position of the first blade assumed at the time of carrying out the wind velocity measurement. It is clear that the flow altering means may be arranged in a radial distance corresponding to the first (or second) radial distance from the hub. Thus, the flow altering means of the second blade are positioned approximately at the same distance from the hub as the measurement carried out from the first blade.

In an advantageous embodiment, the optical measurement system is adapted for probing the velocity component in a range of 0.5-10 m, or 0.75-8 m, or 1-5 m from the emission point. Thus, it is clear that it is indeed a local, near field wind velocity, which is measured and that the flow altering means are to be adjusted within tenths of seconds in order to compensate for fluctuations.

In yet another advantageous embodiment, the emission point and/or the receiving point of the first wind turbine blade is located between a leading edge of the first blade and a point of maximum thickness on a pressure side of the blade. The emission point and/or the receiving point may for instance be located in vicinity of the leading edge of the first blade. The emission point and/or the receiving point may also be located on a pressure side of the first wind turbine blade. Thereby, it is ensured that the probing direction is set substantially in an upwind direction as seen from the blade profile.

In a first embodiment, the emission point during rotation of the rotor follows a concentric circle having a radius corresponding to the first radial distance from the centre axis, and wherein the probing direction is substantially arranged tangentially to the concentric circle. Thus, the probing beam is emitted substantially tangentially from a concentric circle located at the first radial distance from the centre axis. In a second embodiment, the emission point during rotation of the rotor follows a concentric circle having a radius corresponding to the first radial distance from the centre axis, and wherein the optical system is adapted to probe wind speeds in a probing volume located substantially at the first radial distance from the centre axis. Thus, the optical system may probe wind speeds from a region on the same concentric circle or from another region located on an additional concentric circle having a radius corresponding to the first radial distance from the centre axis, the additional concentric circle for instance being located upwind of the rotor plane.

In an advantageous embodiment, the probing direction lies in a quadrant between a chord direction, seen from the leading edge of the blade, and a normal perpendicular to said chord direction and extending from the pressure side of the blade. Thus, the probing direction is set forward of the leading edge of the blade and/or forward of the pressure side of the blade. If the chord direction is defined as 0 degrees and the normal as 90 degrees, the probing direction will advantageously lie in an interval from 0 to 60 degrees, or even more advantageously 0 to 45 degrees. If more than one probing beam is used in a single cross-section of the blade, all the probing beams may advantageously be located within these intervals.

According to an advantageous embodiment, the optical measurement system is adapted for probing wind speeds in a probing volume located in an upwind plane upwind of the rotor plane. Advantageously, the probing volume is located in the upwind plane at the first radial distance from the centre axis. By properly choosing the distance between the upwind plane and the rotor plane, the optical measurement system may probe the wind velocity of particles or aerosols, which the blade will later impact. Thus, the flow altering means may be very accurately adjusted in order to compensate for the velocity fluctuations of the wind impacting the blade.

In one advantageous embodiment according to the invention, the light source is separated from the emission point, the light source being optically connected to the emission point by a light guiding means, such as an optical fibre. In this way, a single light source may conveniently supply light to multiple light emitting means within the blade. Furthermore, the radial position of the light source is thus not constrained to being substantially the first radial distance, but may be chosen more freely. Thus, the light emitting means may be located where a light source would not physically fit, or where a light source would not be able to function reliably, e.g. due to the mechanical influence of the rotor rotation. Furthermore, it is easier to gain access to the light source, e.g. if needing maintenance. In a preferred embodiment, the light guiding means is an optical fibre. In this way, the light emitting means may be electrically isolated from the light source, thereby greatly reducing the risk of lightning strikes to the light emitting means. The light source may advantageously be located in the hub or in a nacelle of the wind turbine. In this way, a single light source may conveniently be used to supply light to multiple light emitting means located in different blades.

The light source or the light guiding means comprises beam splitting means, and wherein the beam splitting means are optically connected to both the light guiding means and a second transmitter part having a second emission point via a second light guiding means. Thus, a simple solution for providing light to separate optical measurement systems in individual blades or individual positions on the same blade is provided. Alternatively, the light source is connected to multiplexing means, in order to supply the different optical transmitter parts with light sequentially, i.e. a time slot for the first emitting means, then a time slot for the second emitting means, etc. Thus, according to an advantageous embodiment, the emission point is located in a first blade, and the second emission point is located in a second blade, i.e. different wind turbine blades. In another advantageous embodiment, the emission points are located in the same wind turbine blade so that the first emission point is located at a first radial distance from the hub or central axis, and the second emission point is located at a first additional radial distance from the hub or central axis.

In one embodiment, the transmitter part comprises a transmitter path for outgoing light, and the receiver part comprises a receiver path for receiving the reflected part of light, and wherein the transmitter path and the receiver path have an overlapping part, wherein the transmitter path and the receiver path are substantially overlapping. Thus, the overlapping part may be used for both the transmitter part and the receiver part of the optical measurement system, and in particular the overlapping part may comprise the emission point and receiving point. Thus, the emission point and receiving point are coincident. The emission point, such as a focusing lens, can thus also be used for collecting the reflected light and guiding it to the detector.

Advantageously, a beam splitter is arranged in both the transmitter path between a light source and the emission point and in the receiver path between the receiving point and the detector. Thus, it is seen that the common path extends from the emission/receiving point to the beam splitter.

According to a first advantageous embodiment, the optical measurement system is a laser Doppler anemometry (LDA) system. According to a particularly advantageous embodiment, the LDA system is a Michelson type anemometer. The aforementioned beam splitter can thus be used to direct a part of the incoming light to a reference mirror, which is later mixed with the received, reflected light from the particles or aerosols. The measured frequency shift corresponds to the wind velocity in the probing direction. When using an LDA system mounted on or in a wind turbine blade, it should be noted that the Doppler shift occurs partly due to the light source moving, i.e. the emission point rotating together with the blade, and due to the movement of the particles or aerosols reflecting the light. The measured Doppler shift corresponds to the wind velocity "observed" by the blade in the probing direction, i.e. the inflow which is a combination of the local rotor velocity and the wind velocity.

According to another embodiment, the optical measurement system is based on feedback into the light source, i.e. the laser. Thus, at least a part of the received, reflected light is transmitted to the light source in order to perturb the power output of the light source. Thus, the detector detects the perturbed power output, and the wind velocity is calculated from the perturbed power output.

It is advantageous to use a coherent light source, e.g. a laser. The laser may be a continuous wave laser or a pulsed laser. The laser may for instance be a CO2 laser, an Argon laser or a Nd:YAG laser. However, the laser may also be a laser diode or a VCSEL, which is particularly suited for compact units. In principle, it may also be sufficient to use LEDs or OLEDs as far as the coherence of such light sources allows this.

The detectors may be any suited detector, such as a photoresistor, a photomultiplier tube, a photo diode or the like. The signal processor may advantageously comprise a phase locked loop or a frequency locked loop, thereby deriving for instance the Doppler shift of the wavelength of the light source.

Light source means any light source being suited for probing wind velocities, advantageously a laser as previously mentioned. The wavelength of the laser beam may lie in the ultraviolet range, the visible range, or the infrared range. Thus, the wavelength may be any in the range from e.g. 100 nm to 20 μm. However, the invention is not restricted to these wavelengths.

According to an advantageous embodiment, the receiving point (or the receiver part of the optical measurement system) has a direction of high sensitivity, and wherein the direction of high sensitivity is oriented to substantially coincide with the probing direction.

According to another advantageous embodiment, at least the transmitter part, the receiver part and the detector are arranged in a single, first unit in the first wind turbine blade. Preferably, the light source and/or the signal processor are also arranged in said first unit. Thus, the first unit may easily be inserted or replaced in the first wind turbine blade. However, the first unit may also be provided with an incoupling for coupling in light from the light source and/or an outcoupling for coupling out light and guiding said light to the detector.

Advantageously, the first unit may be arranged in a bushing, such as a sleeve tube, in the first wind turbine blade. The bushing may for instance be moulded into the first wind turbine blade during manufacture. Thus, the first unit may easily be replaced. Furthermore, this means that optical fibres or other waveguides do not have to be moulded into the structure during manufacture. Also, the bushing may be pre-arranged so as to set the desired probing direction. Thus, the optics of the optical measurement system need not be adjusted after installing it into the wind turbine. The bushing may also contain adjustment means as to align the first unit according to the blade geometry.

The bushing may for instance be provided as a sleeve tube. The sleeve tube may for instance be provided with an inner thread, whereas the first unit may be provided with a mating outer thread. Alternatively, the first unit may be adhered to the sleeve tube or be mechanically engaged, e.g. by screws, nuts and bolts or the like. Using a sleeve tube will make the optical fibres replacable and thereby ensure a maintenance friendly system. Furthermore, the sleeve tube may be provided with a small degree of adjustment possibilities in order to for instance adjust the probing direction within a few degrees, e.g. up to two degrees.

In one embodiment, the first wind turbine blade further is provided with a cleaning system, using e.g. pressurised air, adapted to clear a surface of the emission point and/or the receiving point. Thus, the cleaning system can clean the optical measurement system, which over time may become polluted with particles carried by the wind and due to the rotation of the wind turbine blade. The cleaning system may for instance be provided in connection with the sleeve tube.

According to an advantageous embodiment, the optical measurement system is adapted to emit at least a first probing beam and a second probing beam. This can for instance be achieved by letting the optical measurement system comprise two separate transmitter/receiver units. It can also be achieved by splitting the light beam up into two separate beams and emitting light from two separate emission points. Thus, the light is also advantageously collected at two separate receiving points. However, it may also be possible to emit two or more laser beams from the same emission point, e.g. by use of an optical grating. The two separate beams may probe wind velocities in two different probing volumes, advantageously located in vicinity of each other. Thus, the adjustment of the flow altering means can be carried out in accordance with a weighting between two measurements, e.g. the average between the two measurements, thus compensating for local turbulence or wind velocity fluctuations.

In one embodiment, the first probing beam and the second probing beam form a probing angle lying in an interval of 5-90 degrees, or advantageously 7-75 degrees, or advantageously 10-60 degrees. By probing in two different directions, it is possible to derive two velocity components of wind speed inflow vector or correspondingly a wind speed in a plane and the angle of attack. By adding a third probing direction it may further be possible to derive a third velocity component.

In principle, it may also be possible to split light up into two separate probing beams which are emitted from two separate emission points, and which cross each other in a common measurement volume or probing volume. Thereby a fringe pattern may arise in the probing volume, and the wind velocity can be measured by measuring the frequency of wind particles passing through the common volume. However, this embodiment demands for a high precision of the two separate probing beams.

According to an advantageous embodiment, the first probing beam and the second probing beam are oriented substantially in a cross-sectional plane of a local cross-section of the blade. Thus, the two beams are emitted in the same cross-sectional plane of the local blade profile. Thus, it is possible to derive the two velocity components in the cross-sectional plane, e.g. the wind velocity and the local rotor velocity, thus being able to derive the exact inflow, such as wind speed and angle of attack. The cross sectional-plane is the plane, which includes both the local chord and the local camber.

However, the local rotor velocity can also be deduced from the rotational speed of the rotor. Thus, two separate velocity components are not necessary. In this case, it may be more appropriate to use the two separate wind velocity measurements to calculate the average between the two measurements from the two probing regions. In this case, the velocity measurements of course have to compensate for the mutual probing angle.

When using the two probing beams for deriving two separate wind velocity components it may be advantageous to use a large angle between the two probing beam, ideally 90 degrees. However, due to constructional reasons the probing angle may advantageously be lower, e.g. 45-60 degrees. When using two probing beams for deriving an average of wind velocities from two probing volumes in vicinity of each other, it is advantageous to use a low probing angle, e.g. 5-30 degrees.

When needing to derive two separate wind velocity components, it may also in principle be possible to use a single probing beam and two observation directions, i.e. via a single emission point and two receiving points. The angle between the two observation directions can thus be utilised to derive the two velocity components. However, it is difficult to achieve a sufficiently large angle between the observation directions, since the probing volume must either be located very close to the wind turbine blade or the two receiving points be spaced far apart, in which case also collection of the reflected light may be problematic.

According to one embodiment, the first wind turbine blade comprises a profiled contour, which in the radial direction is divided into a root region with a substantially circular or elliptical profile closest to the hub, an airfoil region with a lift generating profile farthest from the hub, and preferably a transition region between the root region and the airfoil region, the transition region having a profile gradually changing in the radial direction from the circular or elliptical profile of the root region to the lift generating profile of the airfoil region. Thus, the wind turbine blade has a per se conventional profiled contour.

According to an advantageous embodiment, the emission point is located in the airfoil region. Preferably, the receiving point is also located in the airfoil region. Further, the flow altering means may advantageously also be located in the airfoil region. According to an advantageous embodiment, the emission point and/or the receiving point is located within an outer 75% of the airfoil region, i.e. the part farthest from the hub. According to another advantageous embodiment, the emission point and/or the receiving point is located within an outer 50% of the airfoil region. The various emission points and receiving points may be located within said outer regions only.

According to one advantageous embodiment, the first blade comprises a plurality of sets of emission points, said sets of emission points being located at different radial distances from the centre axis. Each set may advantageously comprise one, two or three emission points. Each set of emission points corresponds to separate flow altering devices. Thus, a number of local means are provided to control the local aerodynamic performance and alleviating of loads.

The optical systems may be powered by local power supply units. The power supply units may for instance be located within the hub or the nacelle. In one embodiment, the local power supply is located within the first wind turbine blade. Such a power supply may for instance draw energy from mass and gravity variations due to the rotation of the rotor.

According to another advantageous embodiment, an additional optical system is provided for probing upwind wind speeds in front of the rotor. The additional optical system may for instance be installed on top of the nacelle of the wind turbine or in the hub. This system can be used for compensating for yaw errors, wind shear or the like or for ensuring a substantially constant rotational speed of the rotor. This may be obtained by pitching the individual blades, e.g. cyclic pitching of the blades. Thus, the invention provides an optical system for compensating for overall wind fluctuations and reacting to these fluctuations by pitching the blades and optical systems for probing local wind fluctuations in vicinity of the wind turbine blades, these local fluctuations being compensated for by the local flow altering means.

According to one advantageous embodiment, the first wind turbine blade has a blade length (L), and the emission point and the receiving point are located within a blade length interval of 0.2L to 0.9L, or advantageously within a blade length interval of 0.22L to 0.85L, or more advantageously within a blade length interval of 0.25L to 0.8L, as seen from the root of the first blade. In this notation, the blade root is located at 0 position and the blade tip at position L. Thereby, the system is readily adapted to probe wind speeds in front of the blade at the radial positions of the blade contributing most to the overall energy production of the wind turbine.

According to another advantageous embodiment, the first wind turbine blade has a blade length (L), and the probing region is located at a position in which the wind impacts the first wind turbine blade or a second wind turbine blade within a blade length interval of 0.5L to 0.9L, or advantageously within a blade length interval of 0.55L to 0.80L, or more advantageously within a blade length interval of 0.6L to 0.75L, as seen from the root of the first blade. According to yet another advantageous embodiment, the emission point is located within the same blade length interval. Thereby, the optical measurement system may be adapted to probe the region in which the blade has its largest loads and where compensation has its largest effect on load fluctuations.

In an advantageous embodiment, the first wind turbine blade is pitchable, and the optical measurement system comprises compensation means for compensating for a pitch angle of the first blade. In a first simple embodiment, the compensation means may simply be computational means, which compensate the wind velocity measurement in dependence on the pitch angle of the first wind turbine blade. Computational means may also be used for compensating for variations in the rotational speed of the rotor, thus influencing the local angle of attack and wind velocity perceived by a radial blade section.

According to another advantageous embodiment, the first wind turbine blade is pitchable, and the probing direction is variable in dependence on a pitch angle of the first blade. Thereby, it is for instance possible to adjust the probing direction so that the probing region does not change despite of the blade pitch being changed and/or in order to maximise the resolution of the probed wind speeds. Similarly, the probing direction may be variable in dependence on a rotational speed of the rotor.

It is recognised that the probing direction may be varied in a lot of different ways. The majority of the transmission part of the optical measurement system may for instance be contained in a single unit, and where this unit is variable in angle in relation to the first wind turbine blade. In another embodiment, the optical measurement system is adapted to vary a position of incoming light on a transmitting lens. The transmitting lens may for instance be a lens located at the emission point of the optical measurement system, and the position of incoming light may for instance be varied in angle or position by changing the position of the light source. In one embodiment this is obtained by moving the light source itself, and in another embodiment, this is obtained by moving the position of the emission end of an optical fibre. In an alternative or supplementary embodiment, the optical system is adapted to vary a position of a transmitting lens. Thereby, the lens may be moved for instance in a substantially transverse direction of the incoming light.

According to a second aspect, the invention provides a method, wherein the method comprises the steps of: a) emitting light in a probing direction from an emission point on the first wind turbine blade, said emission point being located in a first radial distance from the centre axis, b) receiving a reflected part of light from a probing region along the probing direction at a receiving point located on the first wind turbine blade at a location in a second radial distance from the centre axis, c) directing said reflected part of light to a detector, d) generating a signal based on detected light in step c), and e) calculating a first velocity component based on the signal from step d). As previously mention, the second radial distance preferably corresponds to the first radial distance.

In one advantageous embodiment, the method further comprises the step of: f) adjusting adjustable flow altering means on the first wind turbine blade in order to adjust an aerodynamic characteristics of the first wind turbine blade, the adjustable flow altering means being located at a third radial distance from the centre axis. As previously mentioned, the third radial distance preferably corresponds to the first radial distance.

In another advantageous embodiment, the method further comprises the step of adjusting the probing direction in dependence on a pitch angle of the first wind turbine blade and/or a rotational velocity of the rotor.

The method may of course also apply to any of the aforementioned embodiments of the wind turbine.

BRIEF DESCRIPTION OF THE DRAWINGS

The invention is explained in detail below with reference to an embodiment shown in the drawings, in which FIGS. 6a-d show schematic views of rotors with different probing directions, FIG. 7 shows a schematic view of a wind turbine where the optical measurement system probes wind speeds in a probing region located in front of the rotor plane, FIG. 10 shows a schematic view of a laser Doppler anemometry system comprising two probing beams, FIGS. 11a-g show various embodiments of flow altering devices.

DETAILED DESCRIPTION OF THE INVENTION

Figure 1:
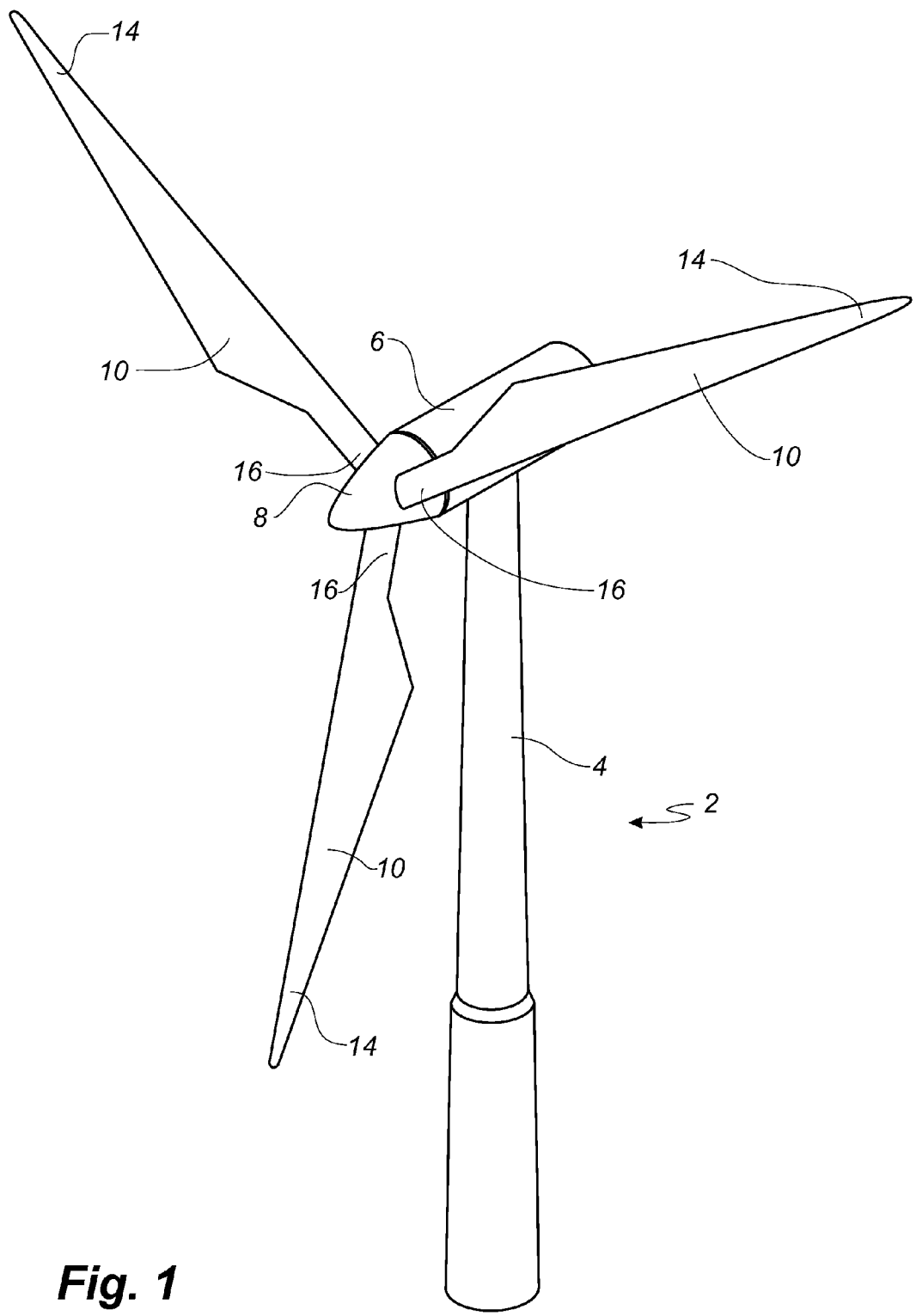
FIG. 1 shows a wind turbine.

FIG. 1 illustrates a conventional modern upwind horizontal axis wind turbine according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 furthest from the hub 8.

Figure 2:
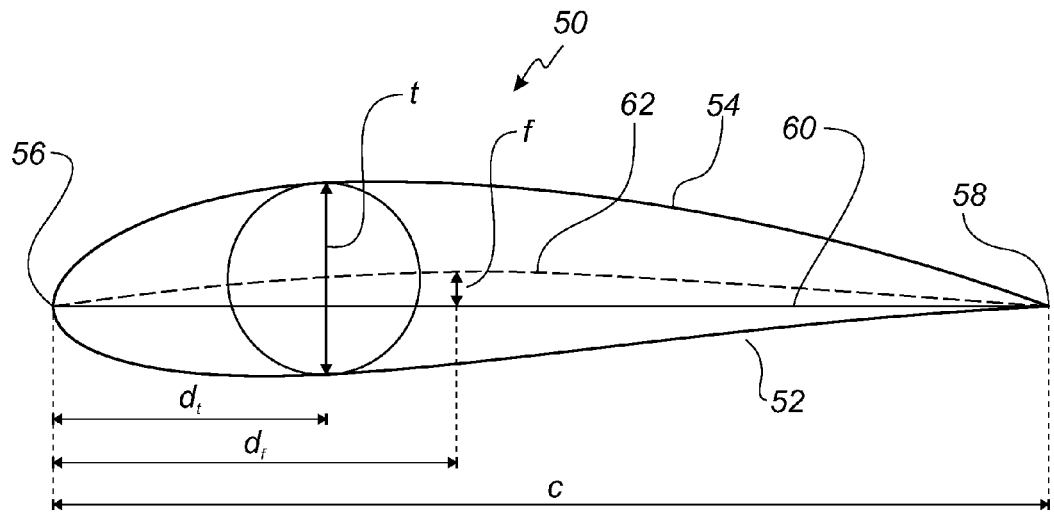
FIG. 2 shows a schematic view of an airfoil profile.

FIG. 2 shows a schematic view of an airfoil profile 50 of a typical blade of a wind turbine depicted with the various parameters, which are typically used to define the geometrical shape of an airfoil. The airfoil profile 50 has a pressure side 52 and a suction side 54, which during use—i.e. during rotation of the rotor—normally face towards the windward side and the leeward side, respectively. The airfoil 50 has a chord 60 with a chord length c extending between a leading edge 56 and a trailing edge 58 of the blade. The airfoil 50 has a thickness t, which is defined as the distance between the pressure side 52 and the suction side 54. The thickness t of the airfoil varies along the chord 60. The deviation from a symmetrical profile is given by a camber line 62, which is a median line through the airfoil profile 50. The median line can be found by drawing inscribed circles from the leading edge 56 to the trailing edge 58. The median line follows the centres of these inscribed circles and the deviation or distance from the chord 60 is called the camber f. The asymmetry can also be defined by use of parameters called the upper camber and lower camber, which are defined as the distances from the chord 60 and the suction side 54 and pressure side 52, respectively.

Airfoil profiles are often characterised by the following parameters: the chord length c, the maximum camber f, the position $d_f$ of the maximum camber f, the maximum airfoil thickness t, which is the largest diameter of the inscribed circles along the median camber line 62, the position $d_t$ of the maximum thickness t, and a nose radius (not shown). These parameters are typically defined as ratios to the chord length c.

Figure 3:
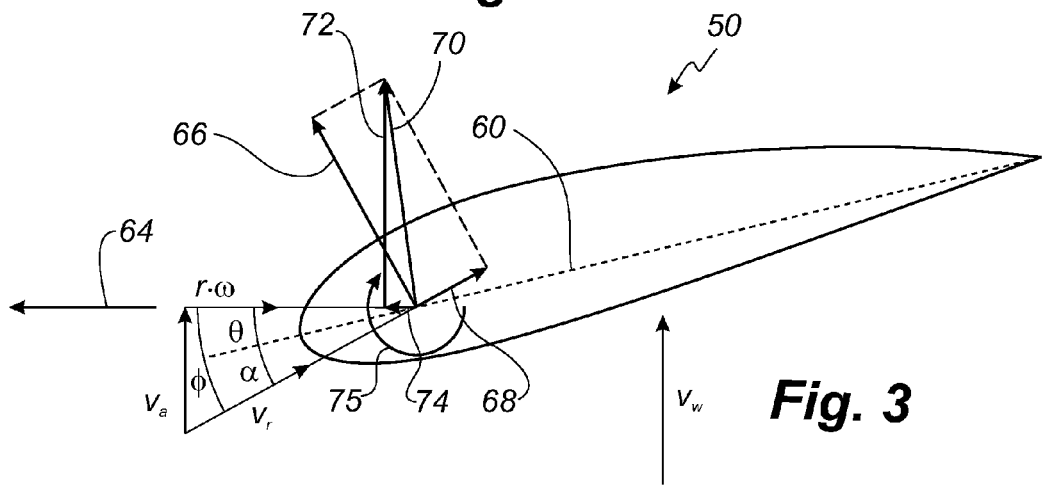
FIG. 3 shows a schematic view of flow velocities and aerodynamic forces at an airfoil profile.

FIG. 3 shows a schematic view of flow velocities and aerodynamic forces at the airfoil profile 50. The airfoil profile is located at the radial position or radius r of the rotor of which the blade is part, and the profile is set to a given twist or pitch angle θ. An axial free stream velocity $v_a$, which according to theory optimally is given as ⅔ of the wind velocity $v_w$, and a tangential velocity r·ω, which is oriented in a direction of rotation 64 for the rotor, combined form a resultant velocity $v_r$. Together with the chord line 60, the resultant velocity $v_r$ defines an inflow angle, φ, from which an angle of attack α can be deducted.

When the airfoil profile 50 is impacted by an incident airflow, a lift 66 is generated perpendicular to the resultant velocity $v_r$. At the same time, the airfoil is affected by a drag 68 oriented in the direction of the resultant velocity $v_r$. Knowing the lift and drag for each radial position makes it possible to calculate the distribution of resultant aerodynamic forces 70 along the entire length of the blade. These aerodynamic forces 70 are typically divided into two components, viz. a tangential force 74 distribution (in the rotational plane of the rotor) and a thrust 72 oriented in a right angle to the tangential force 74. Further, the airfoil is affected by a moment coefficient 75.

The driving torque of the rotor can be calculated by integrating the tangential force 74 over the entire radial length of the blade. The driving torque together with the rotational velocity of the rotor provides the overall rotor power for the wind turbine. Integrating the local thrust 72 over the entire length of the blade yields the total rotor thrust, e.g. in relation to the tower.

If the wind speed changes or local wind speed fluctuations occur, the velocity triangle is influenced and hence also the lift and the forces (or loads) influencing the blade profile.

The load fluctuations can be alleviated by using active flow altering devices, which for instance may change the overall camber of the local profile or which may alter the lift coefficient, thereby readjusting the velocity triangle ($v_r$, $v_a$, r·ω) and the force triangle (70, 72, 74). However, in order to do so, information about the wind speed changes or fluctuations need to be known before the flow actually impacts the local blade profile 50 in order to compensate quickly enough.

Figure 4:
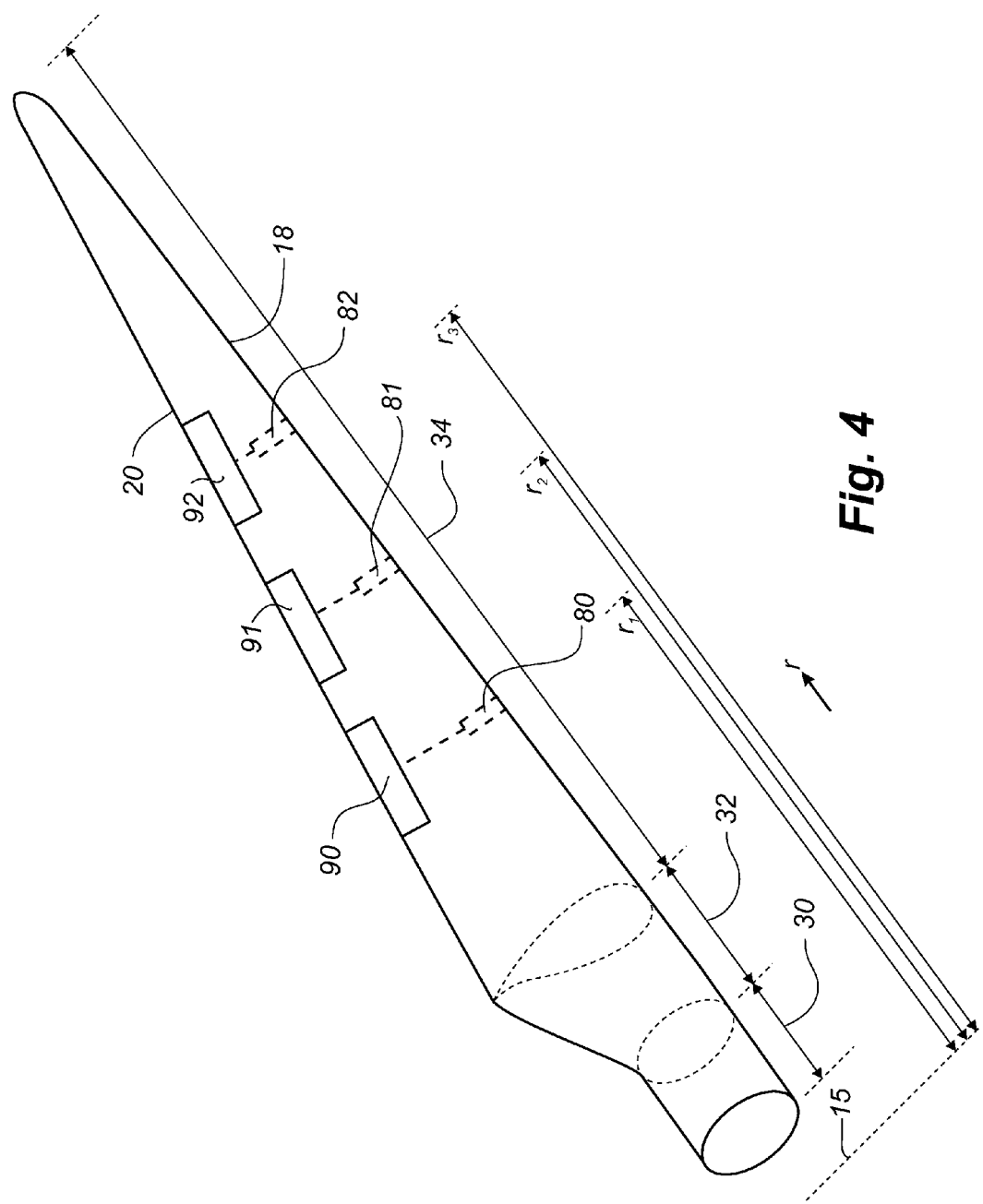
FIG. 4 shows a schematic view of a wind turbine blade provided with local optical measurement systems and corresponding local flow altering means.

FIG. 4 shows a schematic view of a first embodiment of a wind turbine blade 10 according to the invention. The wind turbine blade 10 has the shape of a conventional wind turbine blade and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10 when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 is typically constant along the entire root area 30. The transition region 32 has a transitional profile 42 gradually changing from the circular or elliptical shape 40 of the root region 30 to the airfoil profile 50 of the airfoil region 34. The width of the transition region 32 typically increases substantially linearly with increasing distance r from the hub.

The airfoil region 34 has an airfoil profile 50 with a chord extending between the leading edge 18 and the trailing edge 20 of the blade 10. The width of the chord decreases with increasing distance r from the hub.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

The wind turbine blade 10 according to the invention is provided with a first optical measurement system or laser Doppler anemometer (LDA) system 80, which when the wind turbine blade 10 is mounted to the hub is located at a first radial distance $r_1$ from a central axis of the rotor 15 and thus also in a first distance from the hub. The wind turbine blade is further provided with a second laser Doppler anemometer system 81 located at a second radial distance $r_2$ from the central axis of the rotor as well as a third laser Doppler anemometer system 82 located at a second radial distance $r_2$ from the central axis of the rotor. The three laser Doppler systems 80, 81, 82 are operationally connected to a first flow altering device 90, a second flow altering device 91, and a third flow altering device 92, respectively. In the depicted embodiment, the flow altering devices 90, 91, 92 are surface mounted flaps, which can be deployed in accordance with the wind velocity measurement obtained by the laser Doppler systems 80, 81, 82 in order to adjust the velocity triangle and load triangle as described in relation to FIG. 3. Each LDA system 80, 81, 82 may comprise one, two or three probing beams for measuring wind velocities in one, two or three probing volumes, respectively.

Figure 5A:
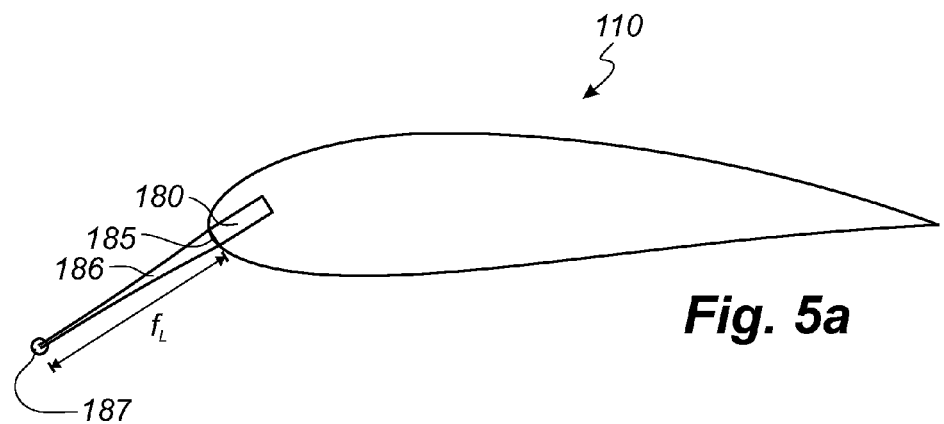
FIGS. 5a-c show cross-sectional views of embodiments with different arrangements of the local measurement systems.
Figure 5B:
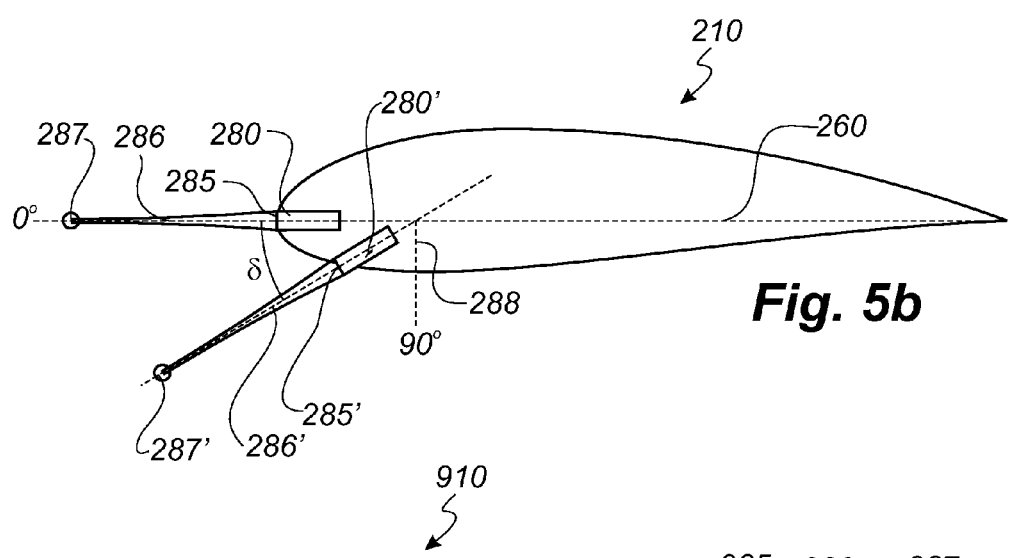
Figure 5C:
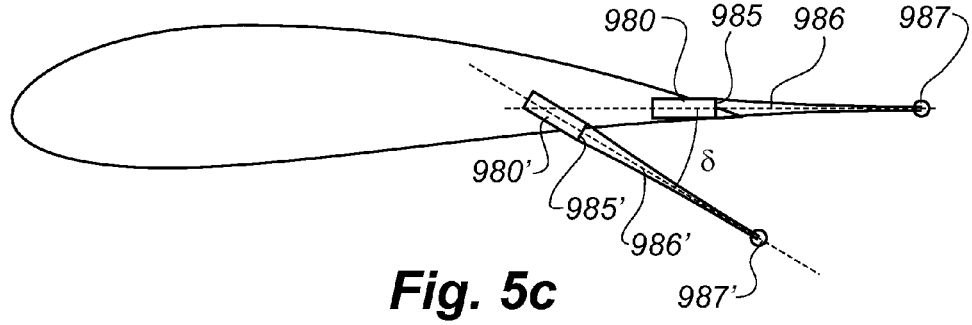

FIG. 5a-c show various embodiments of wind turbine blades provided with LDA systems in different configurations. For the sake of clarity, the flow altering devices are not depicted in these figures.

FIG. 5a shows a cross-sectional view of a first embodiment of a wind turbine blade 110 provided with an LDA system 180. The LDA system 180 is arranged with an emission point 185 near the leading edge of the blade. The LDA system 180 emits a probing beam 186 along a probing direction and probes wind speeds in a probing region or a probing volume 187 located substantially upwind of the wind turbine blade cross-section. The probing beam 186 is focused in a distance $f_L$ from the emission point 185. The probing region 187 is here depicted as being substantially spherical. However, in practise the probing region, which normally is defined as the region of the full width at half maximum (FWHM) intensity, is elongated in the probing region. The probing region is typically longer, when the focal length $f_L$ is increased. In this embodiment, the probing direction is set in a direction, where the probing beam is emitted in a direction from the leading edge and slightly towards the pressure side of the blade 110. Particles or aerosols passing through the probing region 187 backscatter or reflect light. This reflected light is collected by the LDA system 180 at a receiving point 185. Usually, the emission point and receiving point are coincident, e.g. delimited by a window or a lens, which is used for both focusing the probing beam 186 and collecting the reflected light.

FIG. 5b shows a cross-sectional view of a second embodiment of a wind turbine blade 210 in which like numerals refer to like parts of the first embodiment shown in FIG. 5a. In this particular embodiment, the wind turbine blade 210 is provided with two LDA systems 280, 280' in the same cross-section. A first LDA system 280 is arranged with an emission point 285 near the leading edge of the blade. The first LDA system 280 emits a probing beam 286 along a probing direction directed from the leading edge and oriented substantially in continuation of a chord 260 of the local cross-sectional profile and probes wind speeds in a probing region or a probing volume 287 located in front of the leading edge of the profile. A second LDA system 280' is arranged with an emission point 285' on the pressure side of the profile. The second LDA system 280' emits a probing beam 286' along a probing direction and probes wind speeds in a probing region or a probing volume 287' located in front of the leading edge of the profile and on the pressure side of the blade 210, i.e. typically from a plane upwind of the rotor plane. The angle between the two probing beams 286, 286' is denoted δ.

It is seen that both emission points 285, 285' are located in a region between the leading edge and the position of maximum thickness on the pressure side of the blade, cf. also definitions given in relation to FIG. 2. In the coordination system, where the emission direction from the leading edge in direct continuation of the chord 260 is defined as 0 degrees and a normal 288 to the chord on the pressure side of the blade is defined as 90 degrees, the emission point and probing direction are advantageously found in the quadrant between 0 and 90 degrees. More advantageously, the probing direction is found between 0 and 60 degrees, or even more advantageously 0 to 45 degrees.

The embodiments shown in FIGS. 5a and 5b are used for probing upwind wind speeds of the local cross-sectional profile of the first wind turbine blade. Based on these measurements, local flow guiding devices of the first wind turbine blade (not shown) are controlled. The LDA systems are advantageously adapted for probing the velocity component in a probing region located in the range of 0.5-10 m, or 0.75-8 m, or 1-5 m from the emission points. Thus, the systems indeed probe local wind speeds and wind fluctuations.

However, wind speed measurements can also be used to control flow guiding devices of a second wind turbine blade. In this situation, it may be desired to probe wind speeds in probing regions located upwind of the second wind turbine blade instead. An example of such an embodiment is depicted in FIG. 5c showing the cross-sectional profile of a wind turbine blade 910. A first LDA system 980 is arranged with an emission point 985 near the trailing edge of the blade. The first LDA system 980 emits a probing beam 986 along a probing direction directed from the trailing edge and oriented substantially in continuation of a chord 260 of the local cross-sectional profile and probes wind speeds in a probing region or a probing volume 987 located behind of the leading edge of the profile. A second LDA system 980' is arranged with an emission point 985' on the pressure side of the profile. The second LDA system 980' emits a probing beam 986' along a probing direction and probes wind speeds in a probing region or a probing volume 987' located behind the trailing edge of the profile and on the pressure side of the blade 910, i.e. typically from a plane upwind of the rotor plane. The angle between the two probing beams 986, 986' is denoted δ. In this embodiment, the probing range $f_L$ may advantageously be larger than the probing range of the embodiments shown in FIGS. 5a and 5b. The probing regions 987, 987' may advantageously be located within range of 0.5 m to 15 m of the second blade.

FIGS. 6a-d show various possible probing directions for a LDA system located in a wind turbine blade.

FIG. 6a shows a first embodiment illustrating a possible probing direction of the system. During rotation of the rotor a LDA system 380 located within a wind turbine blade of the rotor follows a motion along a concentric circle 325 having a radius from a central axis of the rotor 315. In this embodiment, the LDA system 380 emits a probing beam (or beams) in the cross-sectional plane of the local profile at the LDA system 380. Thus, the probing beams are directed tangentially to the concentric circle 325. The probing region is located at a second radius from the central axis on a second concentric circle 325'. Thus, the part of the blade, which in fact impacts the wind particles in the probing region may be located at this second radius on the blade. Thus, the flow altering devices may advantageously be located at this second radius or be displaced towards the second radius.

FIG. 6b shows a second embodiment illustrating a possible probing direction of the system. During rotation of the rotor a LDA system 480 located within a wind turbine blade of the rotor follows a motion along a concentric circle 425 having a radius from a central axis of the rotor 415. In this embodiment, the LDA system 480 emits a probing beam (or beams) in an inwards direction out of the cross-sectional plane of the local profile at the LDA system 480. The probing region is in this embodiment located at the same radial distance from the central axis 415 as the emission point. Thus, the system may more accurately probe the wind speeds of particles, which the local blade section in fact impacts.

FIG. 6c shows a third embodiment illustrating a possible probing direction of the system corresponding to the embodiment shown in FIG. 5c. During rotation of the rotor an LDA system 1080 located within a first wind turbine blade 1010 of the rotor follows a motion along a concentric circle 1025 having a radius from a central axis of the rotor 1015. In this embodiment, the LDA system 1080 emits a probing beam (or beams) in an inwards direction out of the cross-sectional plane of the local profile at the LDA system 1080. The probing beam(s) are emitted from a location in vicinity of the trailing edge of the first blade 1010 and the probing region is located in front of the leading edge of a second wind turbine blade 1010'. The probing region is in this embodiment located in the same radial distance from the central axis 1015 as the LDA system 1080. The probing direction may also be substantially tangentially to the concentric circle 1025.

FIG. 6d shows a fourth embodiment illustrating a possible probing direction of the system. During rotation of the rotor a LDA system located within a wind turbine blade of the rotor follows a motion along a first concentric circle, whereas the probing region is located at a second concentric circle having a radius smaller than the first concentric circle. In the illustrated embodiment, the observation direction and the probing region are located so that the observation direction is directed substantially tangentially to the second concentric circle. However, it is recognised that the LDA system may be located further inboard or further outboard of the blade.

The LDA system may advantageously probe wind speeds from a probing region located upwind of, i.e. in front of, the rotor plane. This situation is depicted in FIG. 7. During rotation of the rotor, an LDA system located within a first wind turbine blade of the rotor follows a motion along a concentric circle within a rotor plane 1125. The probing region is located in a second plane 1127 located upwind of the rotor plane.

Figures 8, 9A, 9B:
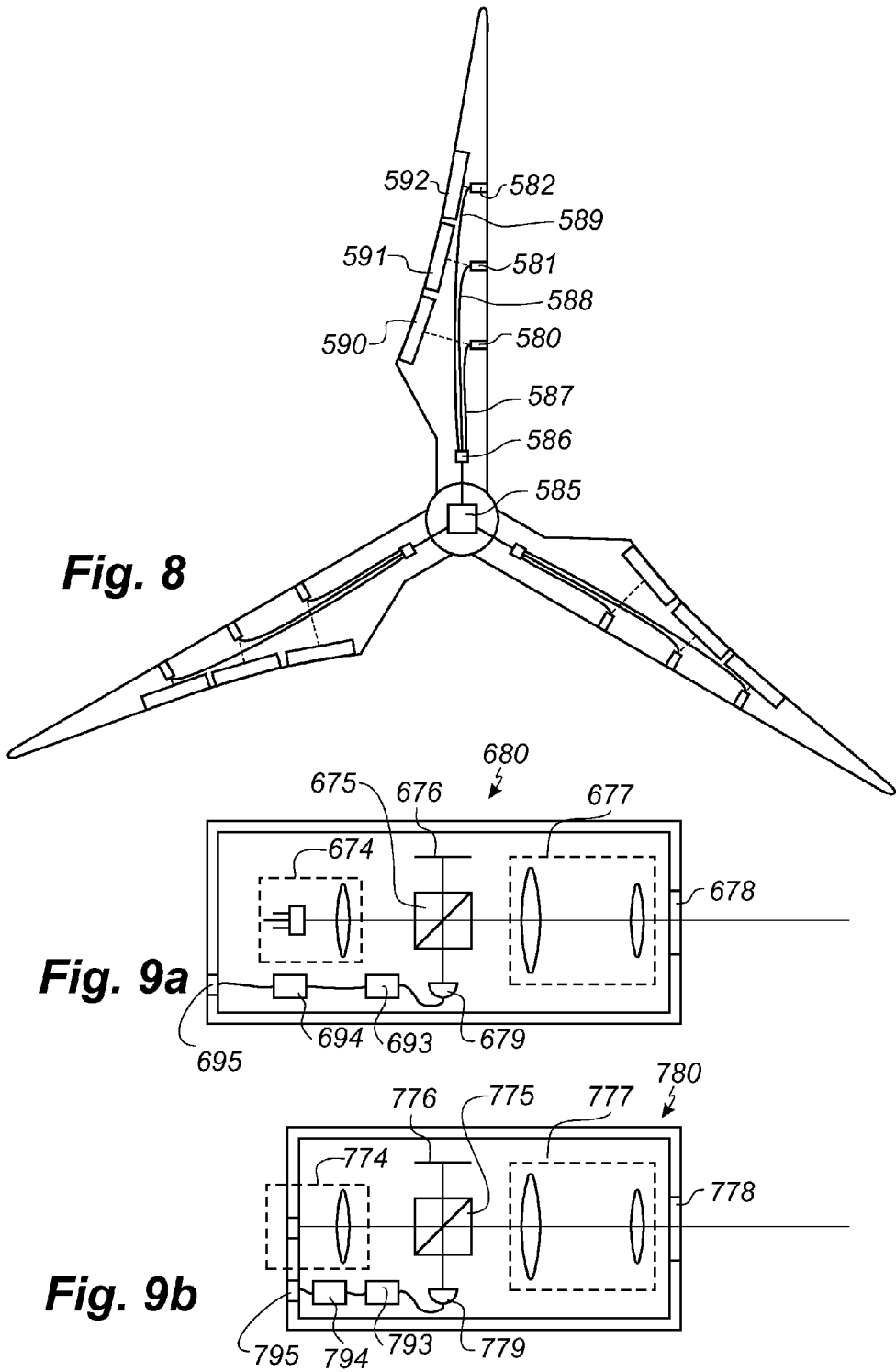
FIG. 8 shows a schematic view of a wind turbine rotor provided with a centrally located laser source.
FIGS. 9a and 9b show schematic views of a first and a second embodiment of a laser Doppler anemometry system, respectively.

In the previously shown embodiments, the LDA systems are depicted as a single unit within the blade. However, embodiments where the light source, i.e. the laser source, is located within the hub or within the nacelle of the wind turbine are also contemplated. Such an embodiment is depicted in FIG. 8. One or more laser sources 585 are located within the hub of a rotor. Laser light from the laser source is split up into a number of separate beams, which are directed to emission points within the wind turbine blades of the rotor, e.g. via optical fibres. One beam is split up into a number of separate beams by a beam splitter 586 or alternatively a multiplexing unit. The split up light is guided to a first LDA unit 580 via a first optical fibre 587, to a second LDA unit 581 via a second optical fibre 588, and a third LDA unit 582 via a third optical fibre 589. In this embodiment, the LDA units 580, 581, 582 emit probing beams (not shown) from an emission point in vicinity of the leading edge of the wind turbine blade. The wind speeds measured by the first LDA unit 580 are used for controlling a first flow altering device 590, the wind speeds measured by the second LDA 581 unit are used for controlling a second flow altering device 591, and the wind speeds measured by the third LDA 581 unit are used for controlling a third flow altering device 592 in order to alleviate for local load fluctuations.

FIG. 9a shows a first embodiment of an LDA unit 680 usable for the invention. The LDA unit 680 comprises a light source means 674 including for instance a laser diode and a condensing lens. The light emitted from the light source means 674 is directed to a beam splitter 675, which splits the light up into a reference beam, which is guided to a reference mirror 676, and a probing beam, which is sent through a lens system 677 and optionally a window 678, which thus constitutes the emission point of the LDA unit 680. In an alternative embodiment, a lens of the lens system 677 may constitute the emission point. Light reflected by particles or aerosols passing through the probing volume is reflected or backscattered and collected through the window 678, which then passes through the lens system 677 and to the beam splitter 675, where the reflected light is mixed with the reference beam. The mixed light is detected by a photo detector 679. It is seen that the system corresponds to a Michelson based laser Doppler anemometry system, where the detected Doppler shift depends on the velocity of the particles passing through the probing volume. The signal from the photo detector 679 is sent to an amplifier 693, and from the amplifier 693 on to a signal processor 694, e.g. comprising a phase locked loop or a frequency locked loop. The signal from the signal processor 694 is sent to an electrical output 695, which can be used for controlling the corresponding flow altering devices.

FIG. 9b shows a second embodiment of an LDA unit 780 usable for the invention and wherein like numerals correspond to like parts of the LDA unit shown in FIG. 9a. The LDA unit 780 comprises a light source means 774 including an incoupling for light from a central laser, e.g. as shown in FIG. 8, and a condensing lens. The light emitted from the light source means 774 is directed to a beam splitter 775, which splits the light up into a reference beam, which is guided to a reference mirror 776, and a probing beam, which is sent through a lens system 777 and optionally a window 778, which thus constitutes the emission point of the LDA unit 780. In an alternative embodiment, a lens of the lens system 777 may constitute the emission point. Light reflected by particles or aerosols passing through the probing volume is reflected or backscattered and collected through the window 778, which then passes through the lens system 777 and to the beam splitter 775, where the reflected light is mixed with the reference beam. The mixed light is detected by a photo detector 779. It is seen that the system corresponds to a Michelson based laser Doppler anemometry system, where the detected Doppler shift depends on the velocity of the particles passing through the probing volume. The signal from the photo detector 779 is sent to an amplifier 793, and from the amplifier 793 on to a signal processor 794, e.g. comprising a phase locked loop or a frequency locked loop. The signal from the signal processor 794 is sent to an electrical output 795, which can be used for controlling the corresponding flow altering devices.

As previously mentioned, FIGS. 5a and 5b show embodiments using two probe beams in the same cross-sectional profile of the wind turbine blade, and where the probe beams are generated by separate LDA units. However, it is also possible to generate two or more probe beams from a single LDA unit. Such an embodiment is shown in FIG. 10. In this embodiment an incoming beam is split up into two separate beams, e.g. by use of a Wollaston prism 896, thus generating a first beam and a second beam. The first and the second beam may advantageously each be sent to a second beam splitter 875, which splits the beam up into a reference beam, which is sent to a reference mirror 876, and a probe beam, which may be sent through a lens system and to the emission point (now shown). In an alternative embodiment, the incoming beam is split up into separate beams by a grating. If two probe beams are needed it may for instance be possible to use the zero'th order beam and one of the first order beams and suppress the other orders or alternatively using a first order and a second order beam and suppressing the rest. If three probe beams are needed it may be possible to use the zero'th order beam and both first order beams.

FIGS. 11a-g show various embodiments of flow altering devices suitable for the invention. Flaps are one type of flow altering means, which are very suitable for fast adjustments of the aerodynamic properties of the local profile. Flaps may be implemented in various ways. As shown in FIG. 11a, the flaps may be implemented as surface mounted flaps, which when deployed, protrude from the surface of the blade profile. A flap may also be provided as a separate element as shown in FIG. 11b, which may be moved rotational and/or translational in relation to the blade itself. Thus, the blade profile is a multi element profile. Alternatively, the flap may be implemented as a camber flap as shown in FIG. 11c, which can be used to change the camber line of the blade profile. It is also possible to use micro tabs as shown in FIG. 11d placed either on the upper and/or lower surfaces of the local profile. Such flow altering devices may very quickly be deployed so that they protrude from the surface of the blade.

The flow altering means may also comprise of a number of ventilation holes for blowing or suction between an interior of the blade and an exterior of the blade. The ventilation holes are advantageously applied to the suction side of the blade as shown in FIGS. 11e and 11f. The ventilation holes can be utilised to create a belt of attached flow. Air vented from the ventilation holes may be used to energise and re-energise the boundary layer in order to maintain the flow attached to the exterior surface of the blade as shown in FIG. 11f. Alternatively, the ventilation holes may be used for suction as shown in FIG. 11e, whereby the low momentum flow in the boundary layer is removed and the remaining flow thereby re-energised and drawn towards the surface of the blade.

It is also possible to use a slat as shown in FIG. 11g. The slat may be connected to the blade in such a way that it is rotational and/or translational movable in relation to the local blade profile.

Figure 12:
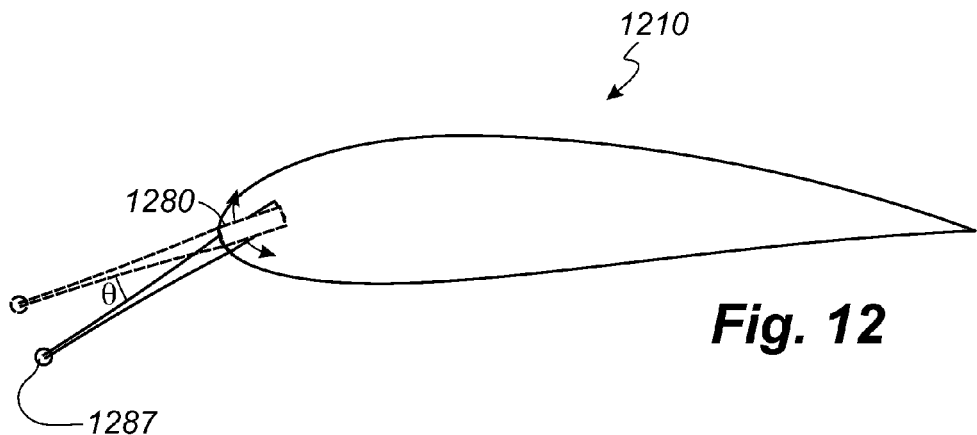
FIG. 12 shows a first embodiment, where the probing direction is variable.

FIG. 12 shows a cross-sectional view of a first embodiment of a wind turbine blade 1210 provided with an LDA system 1280 having a variable probing direction. In this embodiment, the LDA system 1280 is variable in relation to the local blade section. Thereby, a position of a probing volume 1287 may also be varied in relation to the local blade section. Thereby, it is possible to compensate for either a change in blade pitch angle and/or the rotational speed of the rotor. If the blade pitch for instance is varied with angle θ, the probing direction may equally be varied with a corresponding angle in order to compensate for the pitch change.

Figure 13:
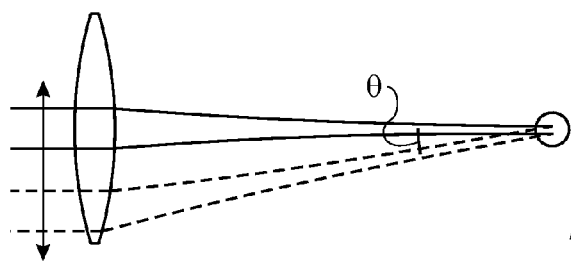
FIG. 13 shows a first embodiment, where the probing direction is variable.
Figure 14:
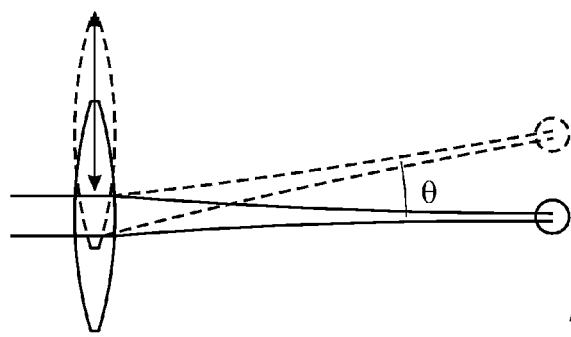
FIG. 14 shows a first embodiment, where the probing direction is variable.

It is recognised that the probing angle may be varied in various ways. As shown in FIG. 13 it is for instance possible to vary the position (or angle) of incoming light on a transmitting lens located at the emission point of the optical measurement system. This may for instance be obtained by moving a light source, e.g. a laser diode or the transmitting end of an optical fibre, in a substantially transverse direction relative to the incoming light (or the transmitting lens). Alternatively or in addition thereto, it is possible to vary the position of the transmitting lens relative to the incoming light as shown in FIG. 14, e.g. by moving the transmitting lens in a substantially transverse direction relative to the incoming light.

The invention has been described with reference to a preferred embodiment. However, the scope of the invention is not limited to the illustrated embodiments, and alterations and modifications can be carried out without deviating from the scope of the invention, which is defined by the claims.

LIST OF REFERENCE NUMERALS 2 wind turbine
4 tower
6 nacelle
8 hub
10, 110, 210, 1010, 1010', blade 1210
14 blade tip
16 blade root
18 leading edge
20 trailing edge
30 root region
32 transition region
34 airfoil region
50 airfoil profile
52 pressure side
54 suction side
56 leading edge
58 trailing edge
60, 260 chord
62 camber line/median line
64 direction of rotation
66 lift
68 drag
70 resultant aerodynamic force
72 axial force (thrust)
74 tangential force
80, 180, 280, 280', 380, laser anemometer 480, 580, 680, 780, 880, 980, 980', 1080, 1280
81, 581 laser anemometer
82, 582 laser anemometer
90, 590 flow altering means/flap
91, 591 flow altering means/flap
92, 592 flow altering means/flap
185, 285, 285' emission point
186, 286, 286' probing beam
187, 287, 287', 1287 probing region/probing volume
288 normal
315, 415, 1015 central axis
325, 425, 1025, 1125 circle
585 laser source
586 splitter/multiplexer unit
587, 588, 589 light guides/optical fibres
674, 774 light source
675, 775, 875 beam splitter
676, 776, 876 reference mirror
677, 777 lens system
678, 778 window
679, 779, 879 photo detector
693, 793 amplifier
694, 794 signal processor
695, 795 electrical output
896 beam splitter/Wollaston prism
1127 upwind plane
C chord length
$d_t$ position of maximum thickness
$d_f$ position of maximum camber
F camber
$f_L$ probing length
r·ω rotational velocity
T thickness
$v_a$ axial velocity
$v_r$ resultant velocity/inflow velocity
$v_w$ wind speed
α angle of attack
δ probing angle
θ pitch angle
φ inflow angle

The invention claimed is:

1. A wind turbine comprising a number of blades including at least a first wind turbine blade extending substantially radially from a hub on a main shaft having a substantially horizontal centre axis, the blades together with the hub constituting a rotor with a rotor plane, and which can be put into rotation by wind, and each blade having an innermost part having a root section of the blade and an outermost part having a tip section of the blade, wherein the wind turbine has an optical measurement system comprising a laser as a light source, an optical transmitter part, an optical receiver part, and a signal processor, wherein the light source is optically coupled to the optical transmitter part, the optical transmitter part comprises an emission point and is adapted for emitting light in a probing direction from said emission point, the optical receiver part comprises a receiving point and a detector, wherein the optical receiver part is adapted for receiving a reflected part of light from a probing region along the probing direction at the receiving point and directing said reflected part of light to the detector so as to generate a signal from the detector based on the received, reflected light, and the signal processor is adapted to determine at least a first velocity component of the inflow from the signal generated by the optical receiver part, wherein the emission point of the optical transmitter part is located in the first blade at a first radial distance from the centre axis, and the receiving point of the optical transmitter part is located in the first blade at a second radial distance from the centre axis, wherein the optical measurement system is adapted to emit at least a first probing beam and a second probing beam, the first and second probing beams being arranged to emit light in separate divergent directions to probe wind velocities in at least two different probing volumes.

2. A wind turbine according to claim 1, wherein the first radial position is substantially identical to the second radial position.

3. A wind turbine according to claim 1, wherein the first blade further comprises adjustable flow altering means, such as distributed actuators, flaps or microtabs, for adjusting an aerodynamic parameter of the blade and located in a third radial distance from the hub, the adjustable flow altering means being controlled by a controlling means, and wherein the controlling means are adapted to receive a signal from the signal processor, the signal being based on at least the first velocity component, optionally with the third radial position being substantially identical to the first radial position.

4. A wind turbine according to claim 1, wherein the wind turbine comprises a second wind turbine blade, and wherein the second wind turbine blade is provided with adjustable flow altering means, such as distributed actuators, flaps or micro tabs, for adjusting an aerodynamic parameter of the second blade, the adjustable flow altering means being controlled by a controlling means, and wherein the controlling means are adapted to receive a signal from the signal processor, the signal being based on at least the first velocity component.

5. A wind turbine according to claim 1, wherein the optical measurement system is adapted for probing the velocity component in a range of 0.5-1 Om, or 0.75-Bm, or 1-5 m from the emission point.

6. A wind turbine according to claim 1, wherein the emission point and/or the receiving point of the first wind turbine blade is located between a leading edge of the first blade and a point of maximum thickness on a pressure side of the blade, preferably with the probing direction lying in a quadrant between a chord direction, seen from the leading edge of the blade, and a normal perpendicular to said chord direction and extending from the pressure side of the blade.

7. A wind turbine according to claim 1, wherein the emission point during rotation of the rotor follows a concentric circle having a radius corresponding to the first radial distance from the centre axis, and wherein the probing direction is substantially arranged tangentially to said concentric circle, alternatively with the optical system being adapted to probe wind speeds in a probing volume located substantially at the first radial distance from the centre axis.

8. A wind turbine according to claim 1, wherein the optical measurement system is adapted for probing wind speeds in a probing volume located in an upwind plane upwind of the rotor plane.

9. A wind turbine according to claim 1, wherein the light source is separated from the emission point, the light source being optically connected to the emission point by a light guiding means.

10. A wind turbine according to claim 1, wherein at least the transmitter part, the receiver part and the detector are arranged in a single, first unit in the first wind turbine blade.

11. A wind turbine according to claim 10, wherein the first unit is arranged in a bushing, wherein the bushing is a sleeve tube, in the first wind turbine blade.

12. A wind turbine according to claim 1, wherein the first probing beam and the second probing beams form a probing angle lying in an interval of 5-90 degrees, or advantageously 7-75 degrees, or advantageously 10-60 degrees.

13. A wind turbine according to claim 1, wherein the first probing beam and the second probing beam are oriented substantially in a cross- sectional plane of a local cross-section of the blade.

14. A wind turbine according to claim 1, wherein the first wind turbine blade has a blade length (L), and wherein the emission point and the receiving point are located within a blade length interval of 0.2L to 0.9L.

15. A wind turbine according to claim 1, wherein the first wind turbine blade has a blade length (L), and wherein the probing region is located at a position in which the wind impacts the first wind turbine blade or a second wind turbine blade within a blade length interval of 0.5L to 0.9L.

16. A wind turbine according to claim 1, wherein the first wind turbine blade is pitchable, and wherein the optical measurement system comprises compensation means for compensating for a pitch angle of the first blade.

17. A wind turbine according to claim 1, wherein the first wind turbine blade is pitchable, and wherein the probing direction is variable in dependence on a pitch angle of the first blade.

18. A wind turbine according to claim 1, wherein the probing direction is variable in dependence on a rotational speed of the rotor.

19. A wind turbine according to claim 17, wherein the optical measurement system comprises a unit comprising the transmission part which is variable in angle in relation to the first wind turbine blade.

20. A wind turbine according to claim 17, wherein the optical measurement system is adapted to vary a position of incoming light on a transmitting lens.

21. A wind turbine according to claim 17, wherein the optical system is adapted to vary a position of a transmitting lens.

22. A method of operating a wind turbine comprising a number of blades including at least a first wind turbine blade extending substantially radially from a hub on a main shaft having a substantially horizontal centre axis, the blades together with the hub constituting a rotor with a rotor plane, and which can be put into rotation by wind, and each blade having an innermost part having a root section of the blade and an outermost part having a tip section of the blade, wherein the method comprises the steps of a) emitting light in a probing direction from an emission point on the first wind turbine blade, said emission point being located in a first radial distance from the centre axis, b) receiving a reflected part of light from a probing region along the probing direction at a receiving point located on the first wind turbine blade at a location in a second radial distance from the centre axis,
c) directing said reflected part of light to a detector,
d) generating a signal based on detected light in step c), and
e) calculating a first velocity component based on the signal from step d) wherein light is emitted from at least a first probing beam and a second probing beam, the first and second probing beam being arranged to emit light in separate divergent directions to probe wind velocities in at least two different probing volumes.

23. A method according to claim 22, wherein the method further comprises the step of:
f) adjusting adjustable flow altering means on the first wind turbine blade in order to adjust an aerodynamic parameter of the first wind turbine blade, the adjustable flow altering means being located at a third radial distance from the centre axis.

24. A method according to claim 22, wherein the method further comprises the step of adjusting the probing direction in dependence on a pitch angle of the first wind turbine blade and/or a rotational velocity of the rotor.

* * * * *